(12) United States Patent
Ramm et al.

(10) Patent No.: US 9,595,818 B2
(45) Date of Patent: Mar. 14, 2017

(54) HOUSING CONSTRUCTION KIT FOR ELECTRICAL EQUIPMENT, IN PARTICULAR INCLUDING PLUG DEVICES AND FUSES

(71) Applicant: Bals Elektrotechnik GmbH & Co. KG, Kirchhundem-Albaum (DE)

(72) Inventors: Andreas Ramm, Kirchhundem (DE); Mareike Bankstahl, Kirchhundem (DE)

(73) Assignee: Bals Elektrotechnik GmbH & Co KG (DE)

( * ) Notice: Subject to any disclaimer, the term of this patent is extended or adjusted under 35 U.S.C. 154(b) by 276 days.

(21) Appl. No.: 14/370,183

(22) PCT Filed: Jan. 29, 2013

(86) PCT No.: PCT/EP2013/000253
§ 371 (c)(1),
(2) Date: Jul. 1, 2014

(87) PCT Pub. No.: WO2013/113490
PCT Pub. Date: Aug. 8, 2013

(65) Prior Publication Data
US 2014/0361674 A1    Dec. 11, 2014

(30) Foreign Application Priority Data
Feb. 3, 2012  (DE) .................. 20 2012 001 075 U

(51) Int. Cl.
| | | |
|---|---|---|
| *H02G 3/08* | (2006.01) | |
| *H02G 3/14* | (2006.01) | |
| *H02G 3/18* | (2006.01) | |

(52) U.S. Cl.
CPC ............ *H02G 3/081* (2013.01); *H02G 3/086* (2013.01); *H02G 3/14* (2013.01); *H02G 3/185* (2013.01)

(58) Field of Classification Search
CPC . H02B 1/26; H02B 1/30; H02B 1/308; H02G 3/08; H02G 3/14; H02G 3/086;
(Continued)

(56) References Cited

U.S. PATENT DOCUMENTS 5,736,676 A * 4/1998 Stelter .................... H02G 3/283
                                                                174/53

FOREIGN PATENT DOCUMENTS

| DE | 3817869 A1 | 11/1989 |
| DE | 1998048489 A1 | 10/1998 |
| DE | 10310630 B3 | 12/2004 |

OTHER PUBLICATIONS

"Related International Patent Application No. PCT/EP2013/000253", "International Preliminary Report on Patentability", Aug. 14, 2014, Publisher: PCT, Published in: CH.
(Continued)

*Primary Examiner* — Dimary Lopez Cruz
(74) *Attorney, Agent, or Firm* — Kaplan Breyer Schwarz & Ottesen, LLP

(57) ABSTRACT

A housing construction kit that includes at least one plug device and/or one fuse. The kit contains a housing base body with numerous installation openings and numerous installation plates. A first coding means is formed on each opening and a second coding means is formed on each plate. Every first coding means of an opening has a unique first coding and every second coding means of a plate has a unique second coding. Every second coding means of a plate is designed to be complementary to at most one first coding means of an opening and every second coding means of a plate is designed to be complementary to a first coding
(Continued)

means of another opening as every second coding means of a plate, which is designed to be suitable for assembly of at least one plug device.

11 Claims, 6 Drawing Sheets

(58) Field of Classification Search
CPC .......... H02G 3/185; H02G 3/081; H02G 3/12; H05K 5/0217; H05K 5/00; H05K 5/0004; H05K 5/0021; H05K 7/00
USPC ......... 312/326, 223.1; 174/50, 58, 559, 560, 174/561, 563, 66, 67; 220/4.02, 241, 242; 361/600
See application file for complete search history.

(56) References Cited

OTHER PUBLICATIONS

Officer: Michael Standring, "Related International Patent Application No. PCT/EP2013/000253", "International Search Report & Written Opinion", Oct. 4, 2013, Publisher: PCT, Published in: EP.

* cited by examiner

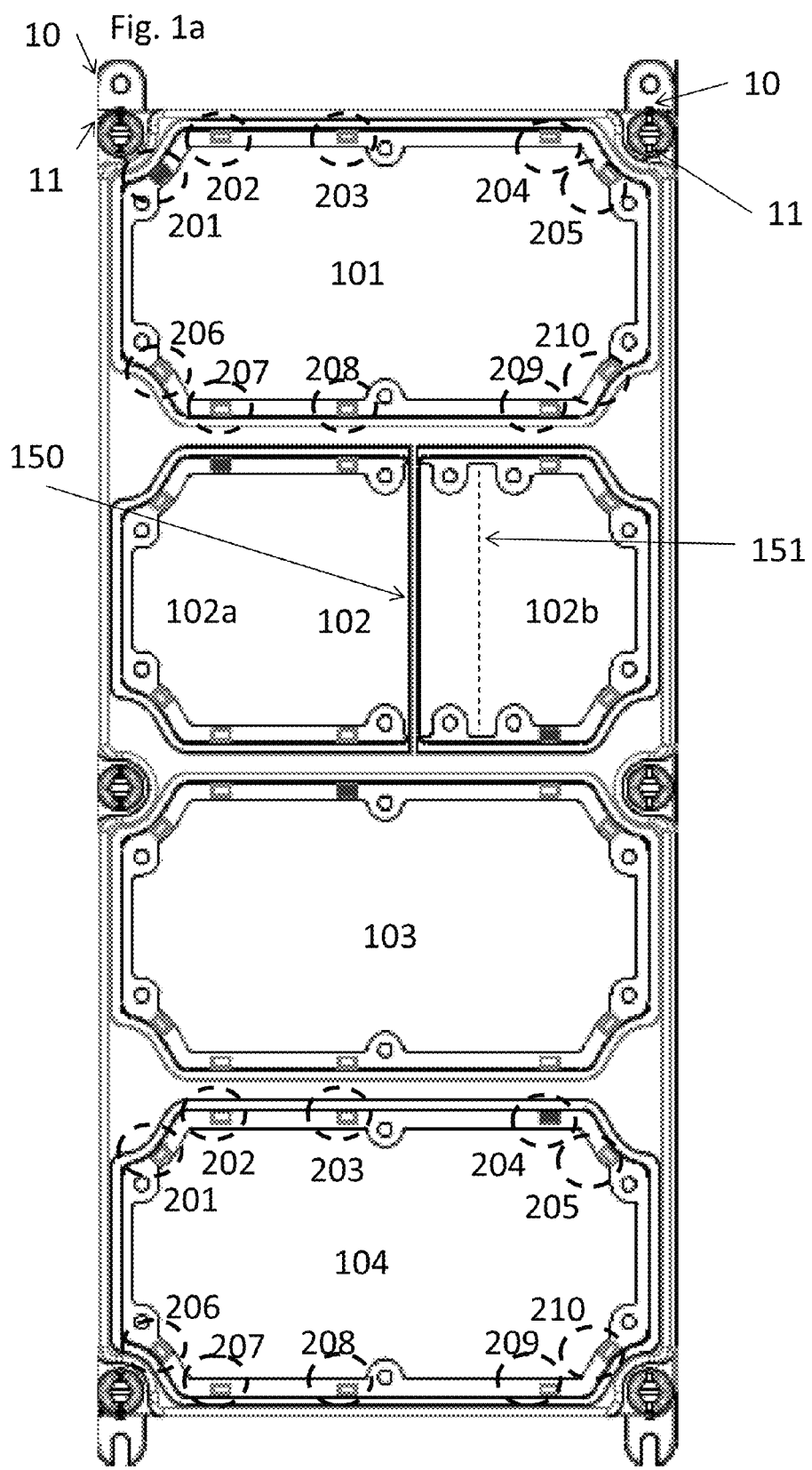

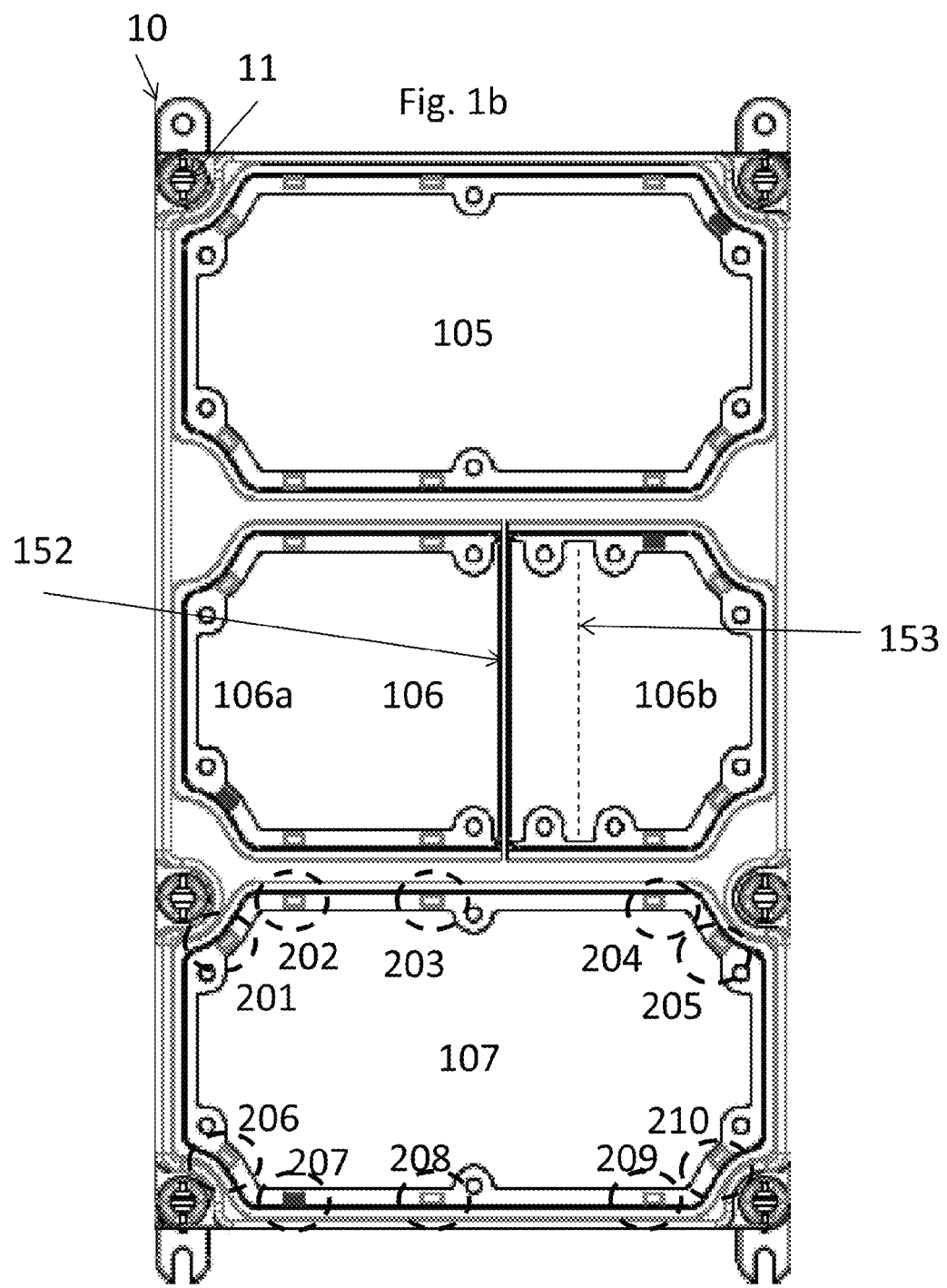

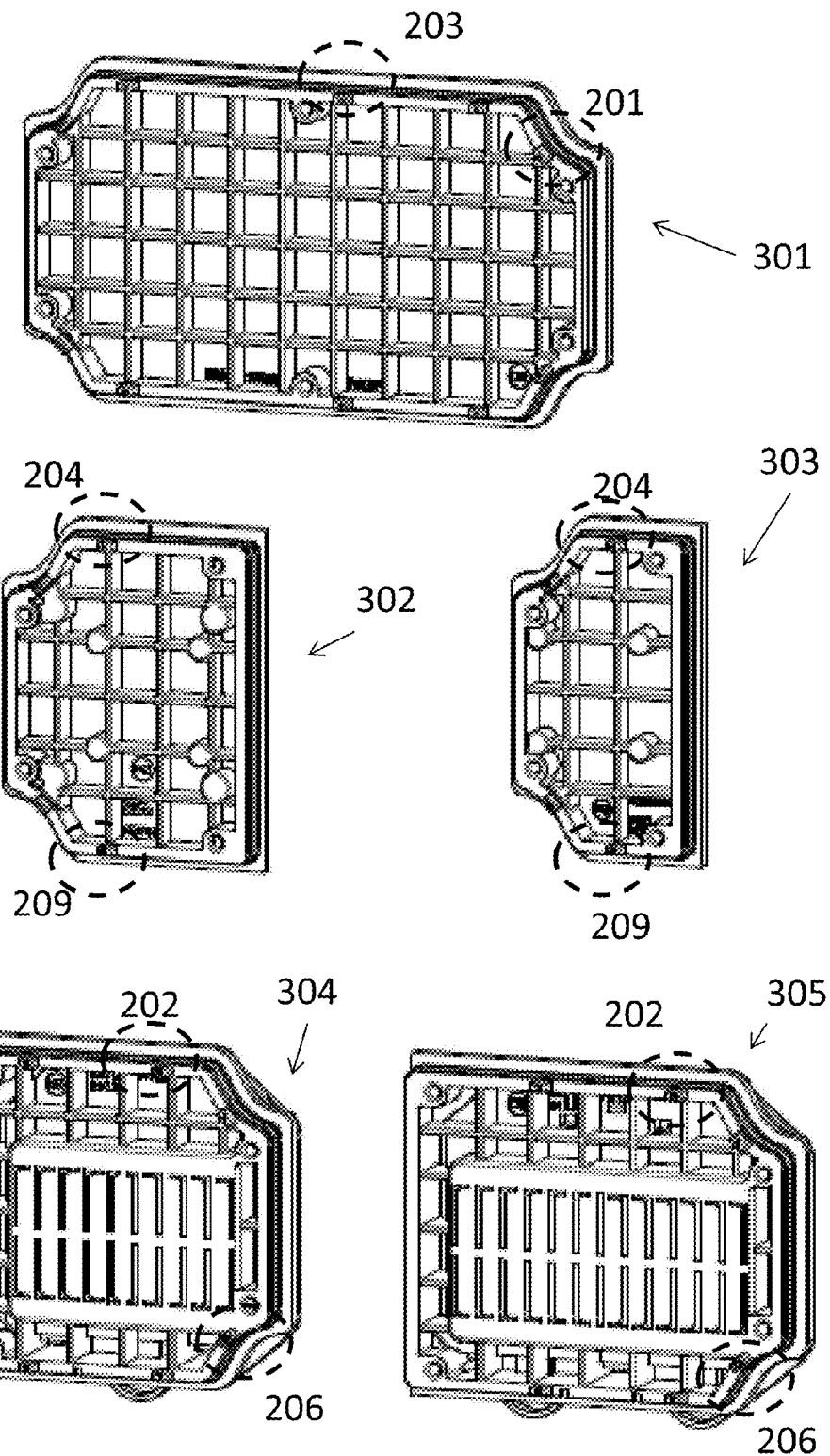

Fig. 3b
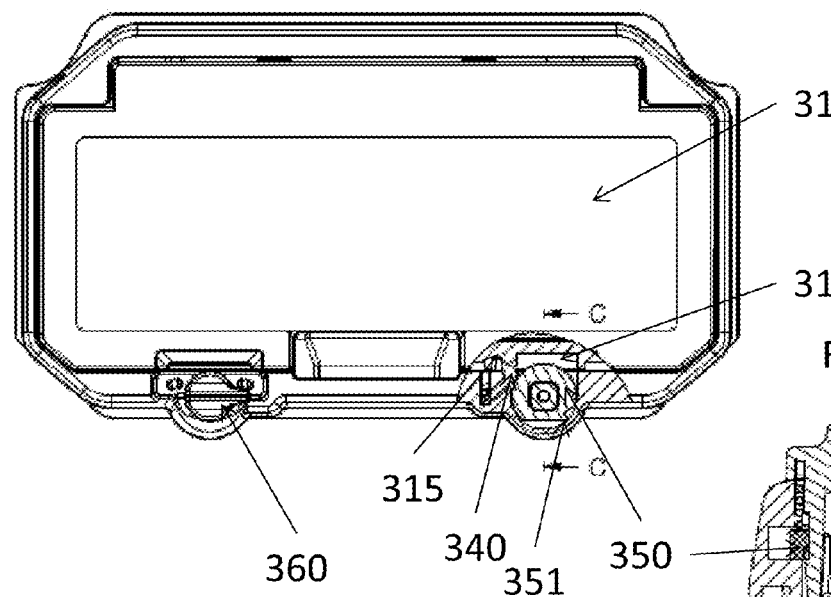
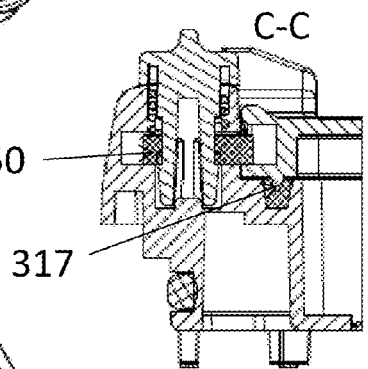
Fig. 3c
C-C
Fig. 3d
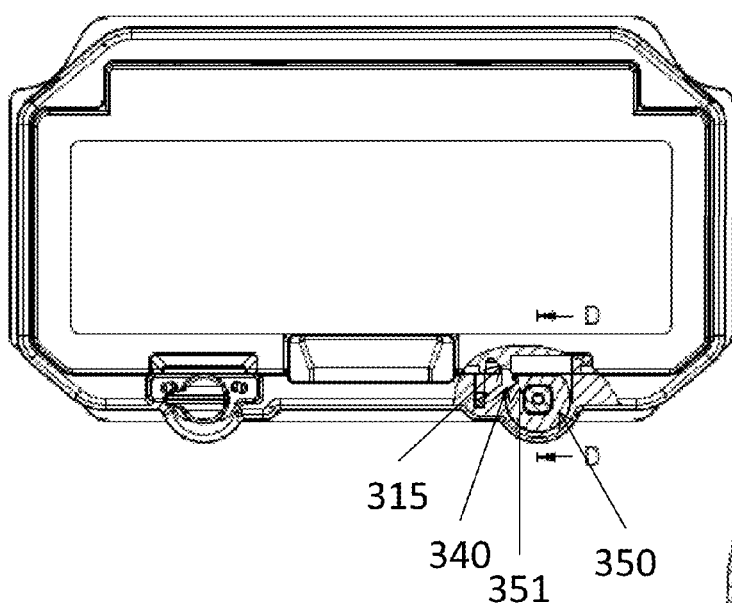
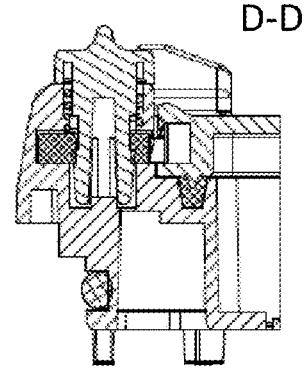
Fig. 3e
D-D

HOUSING CONSTRUCTION KIT FOR ELECTRICAL EQUIPMENT, IN PARTICULAR INCLUDING PLUG DEVICES AND FUSES

FIELD OF THE INVENTION

The invention relates to a housing construction kit for electrical equipment, which includes, for example, plug devices and fuses.

BACKGROUND OF THE INVENTION

Known plug devices and/or electrical outlet combinations include a housing, which has recesses on its top side for the installation of plug devices and/or receptacles and is equipped for being fastened onto a wall, for example. If electrical fuses, for example, automatic fuses, fault current safety switches, cutout fuses, etc. are also to be accommodated in the housing, it will additionally be necessary to have a larger rectangular recess for installation of a pivotable transparent window.

Construction kits are also known for various plug device combinations, for example, from DE 103 10 630 B3. Accordingly, the kit disclosed there includes a housing having at least one installation opening, an installation plate on which at least one plug device can be assembled and an installation plate designed as an installation window made of at least partially transparent material, wherein both the installation plate on which at least one plug device can be assembled and the installation plate designed as an installation window can be equipped for installing in the installation opening of the housing.

It is shown to be an advantage that it is possible in this way to rely on similar basic models of the housing for all desired combinations and now the installation plates in question must be manufactured and stored for the individual assembly with plug devices and windows, such that one window can be provided in each installation opening of the housing in which plug devices can also be assembled.

Another kit for plug device combinations described in DE 103 10 630 B3 includes two housings equipped differently, each having at least one similar installation opening and an installation plate on which at least one plug device can be assembled and each being equipped for assembly in the installation opening of the housing.

It is shown to be an advantage of this construction kit in DE 103 10 630 B3 that a simple and reliable production of very different plug device combinations with a few or many different plug devices is possible with little production preparation, such that, despite the use of different housing sizes, it is still possible to use the same installation plates because the installation openings in the housings are of the same type in each case.

Although the subject matter of DE 103 10 630 B3 thus permits a very flexible and inexpensive production of plug device combinations because there is fundamentally freedom of choice in installing either an "installation plate for a plug device" or an "installation plate for an installation window" in one and the same installation opening as well as assembling one and the same installation plate either in the "installation opening of the first housing" or in the "similar installation opening of the other housing."

With regard to the respective application-specific use of such plug device combinations, however, this leads to extremely high demands of the actual assembly, in particular with respect to any pre-installation of electrical equipment in the respective housing. Since suitable installation plates are included in a construction kit for an individual housing and thus for a plug device assembly and designed as windows, wherein these installation plates which fit in one and the same housing opening and/or are contained in a kit for at least two differently designed housings, each plate fitting in a housing opening of one housing or in a similar housing opening of the other housing, which is designed differently; therefore, due to the components themselves there is essentially no longer any technical certainty that, for example, pre-installed devices can be installed in the correct positions in the housing during assembly of the plug device combinations, so that various safety measures, for example, minimum distances, must be maintained and the installation plates that are suitable with plug devices predetermined for such electrical equipment must also be used for electrical equipment in the housing.

SUMMARY OF THE INVENTION

An important purpose of the present invention is therefore to provide a housing construction kit for electrical equipment, such as plug devices and fuses, for example, which will also permit flexible production or combinations of electrical equipment in a housing but will offer additional technical safety elements which are used in assembly.

Accordingly, the invention makes available a housing construction kit for electrical equipment, in particular for electrical equipment, which includes at least one plug device, and/or one fuse, which includes a housing base body with numerous installation openings and numerous installation plates, whereby at least one installation plate is designed to be suitable for assembly of at least one plug device and/or at least one installation plate is made at least partially of a transparent material and/or at least one installation plate is completely closed and/or at least one installation plate has air passages and/or at least one installation plate has a frame on which an operating flap is mounted pivotably by means of a hinge joint. A first coding means is formed on each installation opening and a second coding means is formed on each installation plate, such that each first coding means of an installation opening in the housing construction kit has a unique first coding and each second coding means of an installation plate in the housing construction kit has a unique second coding, such that each second coding means of an installation plate in the housing construction kit is designed to be complementary to at most one first coding means of one installation opening, and each second coding means of an installation plate, which is made at least partially of a transparent material, at least in the housing construction kit, is designed to be complementary to the first coding means of another installation opening, as each second coding means of an installation plate, which is designed to be suitable for assembly of at least one plug device.

An important advantage is thus that it prevents an arbitrary and thus also incorrect or even dangerous arrangement of at least the installation plates that are suitable for assembly of plug devices and the installation plates that are designed as windows, for example, for fuses located behind the windows such as automatic fuses. Consequently, when assembling a housing construction kit according to the invention, an unintended, incorrect or dangerous arrangement can easily be detected in advance, even including the devices located behind these installation plates, and therefore these situations can easily be prevented.

Depending on the customer's specific wish, however, the flexible supply of an individually assembled construction housing construction kit can be guaranteed, and the kit can be assembled only in the predetermined manner because of the coding means, which act as technical safety elements.

Flexible production of combinations of electrical equipment inside a housing is thus further enabled.

Furthermore, according to a particularly preferred embodiment, with at least one installation plate, which has frames on which an operating flap is pivotably arranged, the frame has a locking mechanism and a closure mechanism, which cooperates with the operating flap, wherein the locking mechanism prevents activation of the closing mechanism as long as the operating flap is open.

An important advantage here is that an operating flap is also sealed only by intentional closing of same, namely by a closure mechanism, which prevents an unintentional closing of the operating flap. Consequently, assembly is also greatly simplified in this way. The operating flap preferably also has a gasket and the locking mechanism is designed to activate the closure mechanism when the operating flap is pivoted to close this operating flap, so that the closure mechanism presses the operating flap onto the gasket in further closing of the operating flap in the subsequently activated state.

The locking mechanism can especially preferably be activated in the closed state of the activation flap, namely to open the activation flap.

The first and second coding means can be supplied in a particularly simple manner in different sizes and/or shapes of the installation openings and/or installation plates, wherein especially preferably the first and second coding means are each supplied through unique arrangements of pin-type extensions or receptacles for accommodating pin-type extensions, so that when only the latter option for unique coding is applied, it is also possible to rely on fundamentally repeating basic components in the production of the housing base bodies and the installation plates. Thus for a unique arrangement of pin-type extensions, for example, certain pin-type extensions which are initially temporary for unique coding can be removed only in the last manufacturing step of the housing construction kit.

BRIEF DESCRIPTION OF THE DRAWINGS

Additional advantages and features of the present invention are derived from the following description of a few specific embodiments, which are given as examples with reference to the accompanying drawings, in which:

FIG. 2 shows five different installation plates as examples suitable for forming unique second coding means.

DETAILED DESCRIPTION

Construction kits for the housings for electrical equipment that can be assembled within the scope of the present invention are described below on the basis of exemplary embodiments, including in particular electrical equipment, comprising at least one plug device and/or a fuse, such as, for example, an automatic fuse, a fault current safety switch, fuse cutouts, etc.

Such housing construction kits contain a housing base body, which may be constructed of one or more parts, comprising, for example, a housing top part and a housing bottom part, which may be joined together in a reversible manner. In the following reference, first to FIGS. 1a through 1d, the discussion is based, for the sake of simplicity, on a multipart housing base body, where FIGS. 1a to 1d show the respective housing top parts of such a housing base body, each of which can be reversibly connected to a housing bottom part (not shown). Such a housing bottom part may be constructed like a box, for example, like housing bottom parts according to DE 103 10 630 B3, but it should be pointed out that, depending on the type of electrical equipment to be accommodated in the housing, a housing bottom part with at least one installation opening may also be formed within the scope of the present invention and/or the base body may also be designed to be in one piece.

Figure 1C:
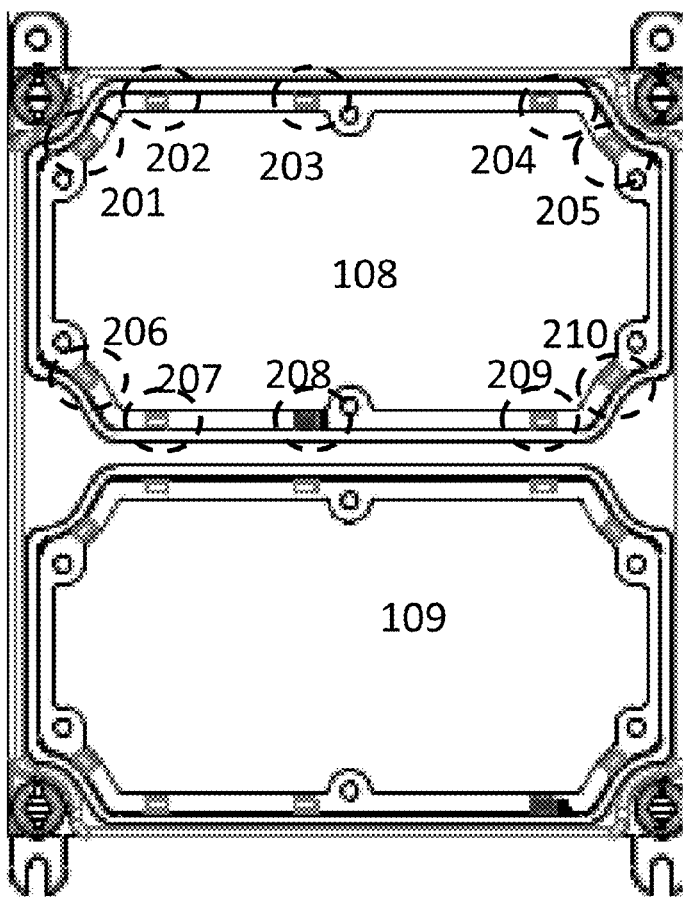
FIGS. 1a) to 1d) each show a top part of the housing of housing base bodies with different designs, with installation openings formed in them and with unique first coding means.
Figure 1D:
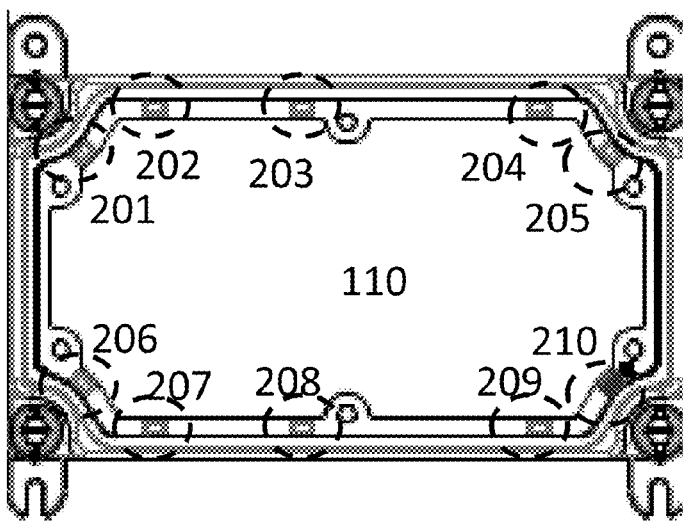

In addition to the connecting means 10, 11 for connecting to a suitable housing bottom part, each housing top part according to FIGS. 1a to 1d includes numerous installation openings 101 to 104 (FIG. 1a), 105 to 107 (FIG. 1b), 108 and 109 (Figure c) as well as 110 (FIG. 1d).

To further enlarge the set of installation openings in the respective manufacture and assembly of a housing construction kit, the installation openings 102a and 102b of the housing top part of a construction kit based on FIG. 1a as well as the installation openings 106a and 106b of the housing top part of a construction kit based on FIG. 1b are separated from one another by an additional web 150 and/or 152, expediently mounted permanently on the housing top part in advance, in particular being integrally molded there. Accordingly, in the case of a construction kit based otherwise on FIG. 1a or FIG. 1b, the permanent attachment in advance, in particular by injection molding, of the web 150 and/or 152 to the housing top part may also be omitted as an alternative, so that instead of the installation openings 102a and 102b or 106a and 106b, there is one installation opening 102 or 106, respectively. Accordingly, in the case of a construction kit based otherwise on FIG. 1a or FIG. 1b, the web 150 or 152 may be offset in parallel as an alternative, mounted permanently elsewhere, in particular by integral molding, for example, on the dotted line on the housing top part marked as 151 or 153, so that instead of the size of the installation openings 102a, 106a, 102b and 106b, as shown there, the installation openings 102a or 106a are increased in size or the installation openings 102b or 106b are reduced in size. Consequently, depending on the customer's specifications, it is possible to assemble a highly individual construction building set based on one or more differently designed housing base bodies having corresponding installation openings, each with unique coding means and likewise with installation plates each having unique second coding means.

As shown in FIGS. 1a to 1d, the installation openings 101, 103, 104, 105, 107, 108, 109, 110 as well as installation openings 102 and 106 each have the same size and shape, as long as the permanent attachment of the web 150 in advance between the installation openings 102a and 102b and/or the web 152 between the installation openings 106a and 106b has been omitted; therefore, in the present example, numerous receptacles for receiving pin-type extensions are formed in predetermined positions on each of the installation openings as a particularly preferred type of first coding means and are each unique in their configuration in a housing construction kit according to the invention.

The installation opening 101, for example, thus has receptacles for holding pin-type extensions in the predetermined positions 202, 203, 204, 205, 206, 207, 208, 209 and 210. In the predetermined position 201, however, the installation opening 101 does not have a receptacle but instead is not suitable for receiving such pin-type extensions there.

The installation opening 102a has receptacles in the predetermined positions 201, 203, 206, 207 and 208, which are the same or corresponding with respect to the installation opening 101. However, the installation opening 102a does not have any receptacle at the same corresponding predetermined position 202 with respect to the installation opening 101, but instead it is not suitable there for receiving such pin-type extensions.

The installation opening 102b has receptacles in the same corresponding predetermined positions 204, 205 and 210 with respect to the installation opening 101. However, the installation opening 102b does not have a receptacle at the same corresponding predetermined position 209 with respect to the installation opening 101 but instead is not suitable for receiving such pin-type extensions there.

If, in modification thereof, the installation openings 102a and 102b are not separated from one another by the web 150 but instead together form a single installation opening 102, such an installation opening has receptacles for receiving pin-type extensions in the same corresponding predetermined positions 201, 203, 204, 205, 206, 207, 208 and 210 with respect to the installation opening 101, but there are no receptacles in the predetermined positions 202 and 209, and instead, such an installation opening is not suitable for receiving such pin-type extensions.

The installation opening 103 does not have a receptacle in the same corresponding predetermined position 203 with respect to the installation opening 101 but instead is not suitable there for receiving such pin-type extensions. In all of the same predetermined positions with respect to the installation opening 101, the installation opening 103 does have a receptacle for receiving pin-type extensions.

The installation opening 104 does not have a receptacle in the corresponding same predetermined position 204 with respect to the installation opening 101, but instead is not suitable there for accommodating such pin-type extensions. In all others of the same predetermined positions with respect to the installation opening 101, the installation opening 104 has a receptacle for receiving pin-type extensions.

The installation opening 105 does not have any receptacle at the same corresponding predetermined position 205 with respect to the installation opening 101 but instead is not suitable for receiving such pin-type extensions there. In all others of the same predetermined positions with respect to the installation opening 101, the installation opening 105 has a receptacle for receiving pin-type extensions.

The installation openings 106a, 106b, 107, 108, 109 and 110 each have no receptacle in the same predetermined positions 206, 204, 207, 208, 209 and/or 210 with respect to the installation opening 101 but instead are not suitable for receiving such pin-type extensions there. In all others of the same predetermined positions with respect to the installation opening 101, the installation openings 106a, 106b, 107, 108, 109 and 110 each have a receptacle for receiving pin-type extensions.

If, in modification thereof, the installation openings 106a and 106b are not separated from one another by the web 152 but instead jointly form a single installation opening 106, then such an installation opening does not have a receptacle in the same predetermined positions 206 and 204 with respect to the installation opening 101 but instead is not suitable for receiving such pin-type extensions there. However, in all others of the same predetermined positions with respect to the installation openings 101, the installation opening 106 does have a receptacle for receiving pin-type extensions.

Consequently, due to the first coding means, it is always ensured that each first coding means in a housing construction kit with only one housing base body is already unique, even in the case of equally large installation openings aligned in a row next to one another in a building construction kit, which includes only one housing base body, i.e., based on FIG. 1a, FIG. 1b, FIG. 1c or FIG. 1d.

Consequently, however, due to the first coding means, it is always ensured that each first coding means is then unique with at least two differently designed housing base bodies in this housing construction kit, even a housing construction kit having housing base bodies of various designs based at least on FIG. 1a and FIG. 1d or based on FIGS. 1b, 1c and/or 1d. If there is always one installation opening 102 and/or 106 instead of the installation openings 102a and 102b and/or 106a and 106b, then it is always ensured that each coding means in this building construction kit is always unique with housing base bodies of various designs, in a housing construction kit having housing base bodies of various designs, based on FIGS. 1a, 1b, 1c and/or 1d.

FIG. 2 shows numerous installation plates, which are suitable for assembly of a housing construction kit within the scope of the invention, wherein, for the sake of simplicity, only closed installation plates 301, 302 and 303 and installation plates 304 and 305 equipped with ventilation passages are shown. However, it should be pointed out that other types of installation plates are also provided in the same way for an individually assembled housing construction kit within the scope of the invention, preferably installation plates which are designed for suitability for assembly of at least one plug device (for example, a plug or a plug receptacle), as also described in DE 103 10 630 B3, for example, i.e., installation plates that are made at least partially of a transparent material and/or installation plates that have at least one frame on which an operating flap is pivotably arranged by means of a hinge joint.

The installation plates 301, 302, 303, 304 and 305 each have pin-type extensions in the same predetermined positions 201, 202, 203, 204, 205, 206, 207, 208, 209 or 210 with respect to the installation openings according to FIGS. 1a through 1d.

Within a housing construction kit assembled according to the invention, in which, for example, an installation plate 301 can be assembled correctly only in the installation opening 101, consequently the pin-type extension in position 201 for unique coding there is removed and the other extensions remain as permanent pin-type extensions.

Furthermore, if another installation plate 301 should be properly mountable only in the installation opening 103 within the same housing construction kit assembled according to the invention, then consequently, for unique coding in position 203 with this additional installation plate 301, the pin-type extension there is removed and the other extensions remain as permanent pin-type extensions earmarked for this purpose.

With the housing construction kit assembled according to the invention in which, for example, only the installation plate 302 can be assembled correctly in the installation opening 102b, the pin-type extension is consequently removed from the position 209 for unique coding and the other extensions remain in place permanently earmarked for this purpose. However, if an installation plate based on installation plate 302 contained in a housing construction kit assembled according to the invention should be mountable only in the installation opening 106b, then consequently, the pin-type extension in position 204 for unique coding is removed and the other extensions expediently remain in place as permanent pin-type extensions earmarked for this purpose.

Alternatively, however, if the web 150 is mounted on the housing top part permanently in advance, parallel to the dotted line labeled as 151, in a construction kit that is otherwise based on FIGS. 1a and 1f only the installation plate 303 can be assembled correctly in the installation opening 102b which is thus reduced in size, then in a corresponding manner the pin-type extension is thus removed accordingly in position 209 on the installation plate 303 for unique coding and the other extensions remain in place permanently earmarked for this purpose. Similarly, with a construction kit that is otherwise based on FIG. 1b and with which, however, as an alternative, the web 152 is mounted permanently in advance on the housing top part on the dotted line labeled as 153 in the case of an installation plate, based on installation plate 303, this installation plate, which should be mountable only in this reduced installation opening 106b, consequently the pin-type extension in position 204 for unique coding is removed and the other extensions remain in place as permanent pin-type extensions earmarked for this purpose.

Furthermore, if the installation plate 304 can be assembled only in the installation opening 102a within a housing construction kit, which is assembled according to the invention, then consequently the pin-type extension in position 202 for unique coding is removed and the other extensions remain as permanent pin-type extensions earmarked for that purpose. However, if an installation plate based on the installation plate 304 can be assembled only in the installation opening 106a, then consequently the pin-type extension in position 206 there for unique coding is removed and the other extensions remain as permanent pin-type extensions earmarked for that purpose.

As an alternative, however, if the web 150 in a construction kit based otherwise on FIG. 1a is mounted on the housing top part permanently in advance, so that it is parallel with the dotted line labeled as 151, and if only the installation plate 305 can be assembled correctly in the installation opening 102a, which is thereby enlarged, then in a corresponding manner, the pin-type extension in position 202 for unique coding is thus removed in a corresponding manner on installation plate 305 and the other extensions remain permanently and are earmarked for this purpose. Similarly with a construction kit which is otherwise based on FIG. 1b, but with which, as an alternative, the web 152 is mounted on the housing top part permanently in advance, so that it is parallel with the dotted line labeled as 153 in the case of an installation plate based on the installation plate 305 which should be mountable only in this enlarged installation opening 106a, then consequently the pin-type extension for unique coding in position 206 is removed and the other extensions remain as permanent pin-type extensions earmarked for that purpose.

It will be obvious to those skilled in the art based on the possibilities described above with reference to FIG. 2 that in this way it is consequently possible to assemble installation plates within a housing construction kit according to the invention, such that the installation plates, each of which has a second unique coding means within the housing construction kit, said second coding means ensuring in conjunction with the first coding means that within the housing construction kit assembled according to the invention, every second coding means of an installation plate is designed to be complementary with at most one first coding means of an installation opening and at least within a housing construction kit of every second coding means of an installation plate, which is at least partially made of a transparent material, every second coding means is designed to be complementary to the first coding means of another installation opening, as every second coding means of an installation plate, which is designed for suitability of the assembly of at least one plug device.

Furthermore, this easily makes possible housing construction kits within which each first coding means of an installation plate is designed to be complementary to at most one second coding means of an installation plate so that within the housing construction kit only one single installation plate from the total number of installation plates in the housing construction kit can be assembled in each of the numerous installation openings.

Consequently, it can always be ensured that, based on FIG. 1a, 1b, 1c or 1d, for example, only one single installation plate from the numerous installation plates in a housing construction kit, which includes only one housing base body, in the housing construction kit can be assembled.

Consequently, within a housing construction kit having housing base bodies of various designs, based at least on FIGS. 1a and 1d or based on FIGS. 1b, 1c and/or 1d, it can always be ensured that every second coding means of an installation plate in the housing construction kit is designed to be complementary to at most one first coding means of an installation opening, so that each of the numerous installation plates in the housing construction kit can be assembled only in a single installation opening.

If only one installation opening 102 and/or 106 is present, instead of separate installation openings 102a and 102b and/or 106a and 106b, then it is always possible to ensure that every second coding means of an installation plate in a housing construction kit having housing base bodies in various designs, based on FIGS. 1a, 1b, 1c and/or 1d, will be designed to be complementary to at most one first coding means of an installation opening, so that each of the numerous installation plates in the housing construction kit can be assembled only in a single installation opening.

FIGS. 3a to 3e show various partial sectional views of another installation plate 306 equipped with second coding means and having a frame 310, in which an operating flap 311 is arranged, so that it is pivotable, and a locking mechanism and a closure mechanism that work together with the operating flap, so that the locking mechanism preferably prevents activation of the closure mechanism as long as the operating flap is open.

Figure 3A:
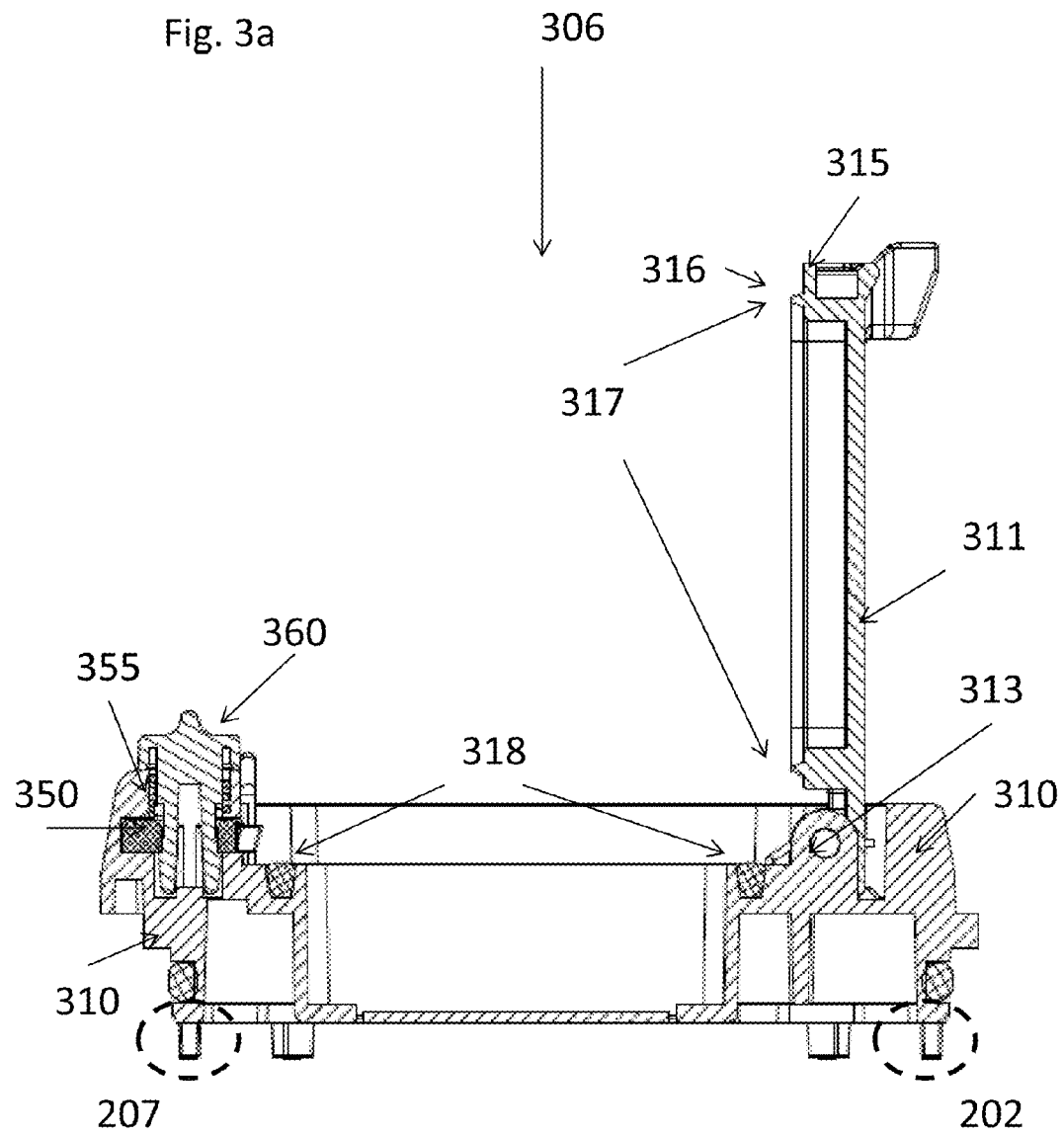
FIG. 3 shows various partial sectional views of a particularly preferred installation plate with a frame in which an operating flap is arranged pivotably and a locking mechanism and a closure mechanism are also provided.

According to FIG. 3a, for example, pin-type extensions as part of the second coding means can be seen on the installation plate, for example, in the setting corresponding predetermined positions 202 and 207 with respect to the installation opening 101 (FIG. 3a). The operating flap shown here may be made in part of a transparent material to form a window 312.

The closure mechanism in the embodiment shown here comprises two disks 350, each of which is arranged on a rotating lever 360 and can be rotated with it and is aligned essentially in parallel with the operating flap with respect to the closed condition of the flap. For each of these disks, the operating flap has a receptacle 314 with which the closure mechanism can engage for closing the operating flap. In the embodiment shown here (FIG. 3a), the receptacles 314 are formed on the side opposite the pivot axis 313 to which the closure mechanism is also designed to be in proximity on the frame.

Each of the disks 350 has a recessed segment, so that in a rotational position of the disks, the recessed segment points in the direction of the receptacle and therefore the disks cannot engage in the receptacles 314 (FIG. 3d) and in another rotational position of the disks 350, the side of the disk which is opposite the recessed segment points in the direction of the receptacles, so the disks 350 can engage in the receptacles 314.

Furthermore, each of the receptacles 314 is bordered by a side surface 315 and by an outer surface 316, which faces in the direction of the installation opening in the closed state. A protrusion 317, which can be pressed when closed into a gasket 318 arranged on the frame, is expediently formed on the bottom side of the operating flap, as seen in the direction of the installation opening in the closed state. The protrusion 317 and the gasket 318 preferably both run all the way around.

The locking mechanism in the embodiment shown here comprises two protrusions 340, which are hinge-connected to the frame, such that each of the protrusions can be brought into a locked state, in which the locking effect of the protrusion 340 is deactivated, and it can be brought into an unlocked state in which the locking effect of the protrusion 340 is activated. Each of the protrusions 340 is hinge-connected directly to the frame near a disk 350 such that each protrusion 340 in the locked state engages in a groove 351 formed on the circumference of the disk 350 (FIG. 3d) and each protrusion 340 in the pivoted state is first out of the groove 351 formed on the circumference of the disk 350 (FIG. 3b).

The groove 351 is therefore designed in a position on the circumference of the disk 350 so that in the locked state of the protrusions 340, the recessed segment points in the direction of the receptacle 314 and therefore the disks cannot engage in the receptacles 314 (FIG. 3d). In the pivoted state, the protrusions 340 cannot be forced out of the groove 351 formed on the circumference of the disk 350 (FIG. 3b), so the rotary lever 360 can fundamentally be rotated up to the rotational position of the disks 350, in which the side of a disk opposite the recessed segment points in the direction of the receptacles. If the operating flap is closed, the disk 350 can thus engage in the receptacles 314, such that the protrusion 317 is also pressed into the gasket 318. To support a simpler engagement of the disks 350 in the receptacles 314 and a more effective pressing of the protrusion 317 into the gasket 318, the disks 350 may be formed so that they taper toward the outside radially and/or have a slope on the top side and/or the bottom side, defining a type of helical path.

To bring the protrusions 340 back into the locked state, the rotary lever 360 is rotated back in the opposite direction until each protrusion 340 engages in the respective groove 351. The rotary levers 360 are preferably prestressed in the locked state of the protrusion 340 and are more relaxed in the pivoted state in comparison with the locked state, for example, by means of spring means 355, which can be attached to the rotary lever 360 on the one end, for example, to move it around and can be attached to the frame 310 on the other end.

Furthermore, the side surfaces 315 of the receptacles 314 and the protrusions 340 are expediently arranged with respect to one another, so that the side surfaces 315 first encounter the protrusions 340 when closing the operating flap 311 and then pivot them until they have assumed the pivoted state and thus are forced out of the grooves 351 (FIG. 3b). The rotary lever 360 is thus rotatable, and when the operating flap is closed, the disks 350 can thus engage in the receptacles 314. The spring means 355 here may induce the required rotation.

A locking and closure mechanism, which is preferably formed, thus operates as follows.

In the open state of the operating flap (FIG. 3a), the protrusions 350 are in the locked state, as also shown in FIG. 3d, so that the recessed segments of the disks 350 point in the direction of the receptacles 314. Consequently, the locking mechanism prevents activation of the closure mechanism, as long as the operating flap is open.

In closing the operating flap, the outside surfaces 316 and/or the side surfaces 315 strike(s) the protrusion 340 and pivot it out of the groove 351, so that the protrusion 340 is driven to the side, for example.

Based on the spring means, the rotary lever 360 is rotated out of the prestressed state in the direction of the more relaxed state up to the rotational position of the disks 350 shown in FIG. 3b, i.e., until in the completely closed state of the operating flap, the sides of the disks 350 opposite the recessed segments engage in the receptacles 314 and also press the protrusion 317 into the gasket 318 (FIG. 3c).

Consequently, the locking mechanism is designed to activate the closure mechanism when the operating flap 311 is pivoted to close the actuating plate such that the closure mechanism is in turn designed to press the operating flap 311 onto the gasket 318 when the actuating plate is closed in the activated state.

To open the operating flap, the rotary lever 360 serves as an adjusting device to reactivate the locking mechanism when the operating flap 311 is still closed, namely to deactivate the closure mechanism (FIGS. 3d and 3e), i.e., in the example described here, until the sides of the disks 350 opposite the recessed segments are rotated out of the receptacles 314 here and have released them, so that the operating flap 311 can be raised and the protrusion 340 is locked again. The locking mechanism then remains activated further while the actuation flap is opened.

It should be clear from the preceding description that a suitable installation plate may be such a plate having a frame on which an operating flap is pivotably arranged by means of a hinge joint and which has a closure mechanism that cooperates with the operating flap and also has a locking mechanism, such that the locking mechanism prevents activation of the closure mechanism as long as the operating flap is open and/or such that the locking mechanism can be activated to open the operating flap by an adjusting device formed on the frame for deactivating the closure mechanism and remains activated while the operating flap remains open even for other housing construction kits for electrical devices in which the housing construction kit contains a housing base body having a numerous installation openings.

LIST OF REFERENCE NUMERALS 10, 11 connecting means;
101, 102, 102a, 102b, 103, 104, 105, 106, 106a, 106b, 107, 108, 109, 110 installation openings;
150, 152 webs;
151, 153 alternative location for webs;
201, 202, 203, 204, 205, 206, 207, 208, 209, 210 predetermined positions;
301, 302, 303, 304, 305, 306 installation plates;
310 frame;

311 operating flap;
312 window;
313 pivot axis;
314 receptacle for disk;
315 lateral surface;
316 outside surface;
317 protrusion;
318 gasket;
340 hinged protrusion;
350 disk groove;
351 spring;
355 means;
360 rotary lever.

What is claimed is:

1. A housing construction kit for electrical equipment comprising at least one of a plug device and a fuse, including:
   a housing base body with a plurality of installation openings, and
   a plurality of installation plates, wherein at least one installation plate in the plurality:
   (i) is designed to be suitable for assembly of the at least one plug device,
   (ii) is at least partially made of a transparent material,
   (iii) is completely closed,
   (iv) has vent passages, and/or
   (v) has a frame on which an operating flap is pivotably arranged by a hinge joint;
   wherein a first coding means is formed on each installation opening,
   wherein a second coding means is formed on each installation plate,
   wherein the first coding means of each installation opening in the housing construction kit has a unique first coding,
   wherein the second coding means of each installation plate in the housing construction kit has a unique second coding, such that:
      the second coding means of each installation plate in the housing construction kit is designed to be complementary to at most one first coding means of a respective installation opening, and
      at least in the housing construction kit, the second coding means of each installation plate, which is made at least partially of the transparent material, is designed to be complementary to the first coding means of another installation opening than every second coding means of the installation plate, which is designed to be suitable for assembly of the at least one plug device.

2. The housing construction kit according to claim 1, wherein the first coding means of each installation opening in the housing construction kit is designed to be complementary to at most one second coding means of a respective installation plate, so that only one single installation plate in the plurality of installation plates in the housing construction kit can be assembled in each of the plurality of installation openings.

3. The housing construction kit according to claim 1, further comprising:
   two differently designed housing base bodies, each of which has at least one installation opening with the first coding means formed thereon, wherein each of the first coding means in the housing construction kit is unique;
   wherein each of the plurality of installation plates include the second coding means formed thereon, and
   wherein the second coding means of each installation plate in the housing construction kit has the unique second coding, such that the second coding means of each installation plate in the housing construction kit is designed to be complementary to at most one first coding means of a respective installation opening, so that each one of the plurality of installation plates in the housing construction kit can be assembled only in a single installation opening.

4. The housing construction kit according to claim 1, wherein the at least one installation plate has a frame, wherein the frame is arranged with the operating flap so that it can be pivoted, wherein a closure mechanism is adapted to cooperate with the operating flap and a locking mechanism, and wherein the locking mechanism is adapted to prevent activation of the closure mechanism as long as the operating flap is open.

5. The housing construction kit according to claim 4, wherein the operating flap also comprises a gasket and the locking mechanism is designed to activate the closure mechanism when the operating flap is pivoted to close an actuating plate, and wherein the closure mechanism is designed to press the operating flap onto the gasket when the actuating plate is closed in an activated state.

6. The housing construction kit according to claim 5, wherein the locking mechanism is adapted to be activated by an adjusting device that is formed on the frame when the operating flap is closed, for deactivation of the closure mechanism for opening the operating flap, and wherein the locking mechanism remains activated when the operating flap is open.

7. The housing construction kit according to claim 1, wherein uniqueness of the first coding means and the second coding means are made available through different sizes and/or shapes of the installation openings and/or the installation plates.

8. The housing construction kit according to claim 1, wherein uniqueness of the first coding means is supplied by forming pin-type extensions arranged on each installation opening in a unique way or by receptacles for receiving the pin-type extensions, and wherein the uniqueness of the second coding means is provided by a complementary design of the pin-type extensions and the receptacles for receiving the pin-type extensions formed uniquely on each installation plate with respect to the first coding means.

9. The housing construction kit according to claim 1, wherein the housing base body has at least one housing top part and at least one housing bottom part that are adapted to be joined together in a reversible manner, and wherein the at least one housing top part and/or the at least one housing bottom part is formed with the at least one installation opening.

10. An installation plate for a housing construction kit for electrical equipment in which the housing construction kit includes the housing base body with the plurality of installation openings according to claim 1, having a frame, on which the operating flap is pivotably arranged by the hinge joint, and which has a closure mechanism that cooperates with the operating flap and has a locking mechanism and a closure mechanism, wherein the locking mechanism prevents activation of the closure mechanism as long as the operating flap is open and/or wherein the locking mechanism is adapted to be activated to open the operating flap by an adjusting device formed on the frame when the operating flap is closed for deactivating the closure mechanism for opening the operating flap and remains activated when the operating flap is open.

11. The housing construction kit according to claim 10, wherein the operating flap also comprises a gasket and the locking mechanism is designed to activate the closure mechanism when the operating flap is pivoted to close the operating flap, and wherein the closure mechanism is designed to press the operating flap onto the gasket when the actuating plate is closed in an activated state.

\* \* \* \* \*